United States Patent Office 3,445,184
Patented May 20, 1969

3,445,184
PROCESS FOR PRODUCING SHAPED MORDENITE BODIES
Osgood J. Whittemore, Jr., Bellevue, Wash., assignor to Norton Company, Worcester, Mass., a corporation of Massachusetts
No Drawing. Continuation-in-part of application Ser. No. 547,379, May 3, 1966. This application Sept. 18, 1967, Ser. No. 668,628
Int. Cl. C01b *33/28*
U.S. Cl. 23—112   1 Claim

ABSTRACT OF THE DISCLOSURE

Mordenite, in the form of shaped pellets is produced by autoclaving, below 290° C., fired silica-clay-sodium silicate bodies in aqueous sodium silicate including between 0.1 and 15 mole percent silica in solution.

---

This is a continuation-in-part of application Ser. No. 547,379 filed May 3, 1966, now abandoned, which in turn is a continuation-in-part of Ser. No. 164,994 filed Jan. 8, 1962, now abandoned, for Synthetic Mordenite and Process of Preparation.

In copending U.S. application S.N. 80,552, now abandoned, filed on Jan. 4, 1961, by the present inventor's colleague, L. B. Sand, is disclosed a synthetic, high silica zeolite having unique properties. In the methods of preparation exemplified in that application, the product is a crystalline powder. For many applications it is desirable or necessary that the materials be available in the form of strongly bonded pellets.

Pellets can be formed from the powdered product by adding ceramic bonding agents and firing the material after it is shaped into the desired form. Such a method of forming aggregates is satisfactory for many purposes but requires additional expense, as compared to the method of the present invention, and is also objectionable because it results in a less pure material in the aggregates than in the starting powder, and is unstable in said environments.

Accordingly, it is an object of the present invention to provide zeolite aggregates in a self-bonded form, of high strength, and stable in acid environments.

It is a further object of this invention to provide methods for forming such aggregates.

According to the present invention it has been discovered that synthetic mordenite (a zeolite of composition $Na_2O \cdot Al_2O_3 \cdot 9\text{--}10SiO_2 \cdot nH_2O$) can be prepared by forming shapes of mineral mixtures of the mordenite composition, firing the shapes to a temperature below complete vitrification, and subsequently heating the fired shapes together with aqueous sodium silicate solution below 290° C.

As examples of this invention, six mixtures were prepared having the following molar compositions, excluding water:

| Mixture No.: | Molar composition |
|---|---|
| C44 | $Na_2O \cdot Al_2O_3 \cdot 10SiO_2$. |
| C45 | $Na_2O \cdot Al_2O_3 \cdot 9.5SiO_2$. |
| C46 | $Na_2O \cdot Al_2O_3 \cdot 9SiO_2$. |
| C47 | $Na_2O \cdot Al_2O_3 \cdot 8.5SiO_2$. |
| C49 | $Na_2O \cdot 1.33Al_2O_3 \cdot 11SiO_2$. |
| C50 | $Na_2O \cdot 0.75Al_2O_3 \cdot 9SiO_2$. |

It can be seen that the first four mixtures cited have equal proportions of $Na_2O$ and $Al_2O_3$ while the proportion of $SiO_2$ varies. Mixture C49 has excess $Al_2O_3$ while mixture C50 has excess $Na_2O$ in terms of the theoretical mordenite composition.

These mixtures were prepared from three materials having the following chemical analyses:

|  | Georgia kaolin, percent | Diatomaceous earth, percent | Aqueous sodium silicate, percent |
|---|---|---|---|
| $SiO_2$ | 45.3 | 87.3 | 28.7 |
| $Al_2O_3$ | 38.4 | 2.7 | |
| $Na_2O$ | 0.3 | | 8.9 |

Plastic compositions were prepared, as follows:

| Mixture No. | Georgia kaolin, percent | Diatomaceous earth, percent | Aqueous sodium silicate, percent | Added water, percent |
|---|---|---|---|---|
| C44 | 19.15 | 26.57 | 54.28 | 7.7 |
| C45 | 19.95 | 24.31 | 54.74 | 2.4 |
| C46 | 20.59 | 22.07 | 57.33 | 0 |
| C47 | 21.37 | 19.64 | 58.98 | 0 |
| C49 | 23.94 | 26.25 | 49.82 | 10.3 |
| C50 | 16.27 | 22.01 | 61.72 | 0 |

These compositions were extruded into $\frac{3}{16}''$ diameter pellets which were then dried and fired at 600° C. for one hour. After firing, the pellets were placed in steel autoclaves with a volume in milliliters of the above described sodium silicate solution equal in number to the weight in grams of pellets. The autoclaves were then sealed and heated 16 hours at 175° C.

After cooling, the pellets were removed and washed with water. They were very strong. Crystal composition was then determined by X-ray diffraction, as follows, mentioning the constituents found in order of amount from largest to smallest.

| Mixture No. | Crystal composition |
|---|---|
| C44 | Mordenite, Quartz (trace). |
| C45 | Mordenite, Phillipsite. |
| C46 | Mordenite, Phillipsite. |
| C47 | Mordenite, Phillipsite, Analcime, Quartz. |
| C49 | Mordenite, Micas. |
| C50 | Phillipsite, Analcime, Quartz, Mordenite. |

It can be seen from the above results that mordenite will form as the principal phase in our process when the formed material has an analysis of $Na_2O \cdot 1$ to $$1.33Al_2O_3 \cdot 8.5\text{--}11SiO_2$$

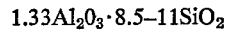

In this invention may be employed any combination of reactive ceramic materials containing as their principal constituents, $SiO_2$, $Al_2O_3$, and $Na_2O$, as long as the molar composition is correct. In general, I prefer not to use materials containing unreactive quartz.

The present invention contemplates formation of aggregates, spheres, pellets, or other shapes by extruding, ramming, pressing, or slip-casting, choosing that method most applicable to the shape desired.

Any desired temperature below vitrification may be employed in the firing step as long as sufficient pores are available in the shapes to allow entry of sodium silicate solution for reaction during the autoclaving treatment, and so long as the temperature is sufficiently high to produce strong pellets or other shapes.

The reactant liquor must contain, in solution, from 0.1 mole percent to 15 mole percent dissolved silica in the form of sodium silicate solution. Outside of these conditions the strength is unsatisfactory and the crystallization is inhibited.

After formation, I may also leach the material with mineral acids thus preparing hydrogen mordenite. Also, I may exchange the sodium or hydrogen ions in this sodium or hydrogen mordenite with other ions.

It has been found that in the case of mordenite prepared according to this invention where the reaction step, following firing, takes place below 200°, the material can be treated with acid to form a particularly useful, very open hydrogen form of mordenite.

The following runs, which demonstrate the importance of control of the content of dissolved silica in the aqueous portion of the reaction batch, were run at 190° C. In all cases, enough aqueous solution was employed to cover the pellets. The pellets were short lengths of ⅛″ extrudate.

The symbols used are: A for alumina, H for water, N for soda, and S for silica. Thus $NAS_{10}$ means 1 mole of soda, one mole of alumina, and 10 moles of silica; and $N_{.3}SH_{8.7}$ means .3 mole of soda, 1 mole of silica and 8.7 moles of water.

In the tables excellent crystallinity means about 100% mordenite produced in 18 hours or less, very good means 90% or better, and unacceptable is less than 50%. In run G, for example, the crystalline product, after 18 hours, was 35% mordenite, 40% albite, and 25% phillipsite.

| Run | Pellet composition | Aqueous phase composition | Mole percent $SiO_2$ in solution | Strength | Crystallinity |
|---|---|---|---|---|---|
| A | $NAS_{10}$ | $N_{.3}SH_{8.7}$ | 10 | Excellent | Excellent. |
| B | $NAS_{10}$ | $N_{.3}SH_{15.8}$ | 5.9 | Good | Do. |
| C | $NAS_{10}$ | $N_{.3}SH_{26.7}$ | 3.56 | do | Very good. |
| D | $NAS_{10}$ | $N_{.3}SH_{337}$ | .03 | Excellent | Unacceptable. |
| E | $NA_{.9}S_{10}$ | $N_{.3}SH_{8.24}$ | 11.1 | do | Excellent. |
| F | $NA_{.9}S_{10}$ | $N_{.4}SH_{5.57}$ | 14 | Very good | Do. |
| G | $NAS_{10}$ | $N_{.5}SH_{4.2}$ | 17.5 | Very weak | Unacceptable. |

What is claimed is:

1. A method of making synthetic, strongly bonded aggregates of mordenite comprising forming a plastic mix of clay, reactive silica, sodium silicate and water having substantially the composition of mordenite, there being present in the mix from about 1 to 1.33 moles of $Al_2O_3$ and from 8.5 to 11 moles of $SiO_2$ per mole of sodium oxide in said sodium silicate, forming pellets from said mix, firing said pellets at a temperature high enough to produce strongly bonded stable pellets but below complete vitrification of the mix, and then heating said pellets between 175 and 200° C. in the presence of a water solution of sodium silicate sufficient to cover said aggregates and containing from 0.1 mole percent to 15 mole percent dissolved silica whereby sodium mordenite crystals are formed.

References Cited

UNITED STATES PATENTS

| | | | |
|---|---|---|---|
| 943,535 | 12/1909 | Gans | 23—111 |
| 1,140,262 | 5/1915 | Gans | 23—111 |
| 2,882,244 | 4/1959 | Milton | 23—113 |
| 3,119,659 | 1/1964 | Taggart et al. | 23—112 |
| 3,130,006 | 4/1964 | Rabo et al. | 23—111 X |
| 3,334,964 | 8/1967 | Reid | 23—113 |

FOREIGN PATENTS 992,872  5/1965  Great Britain.

OTHER REFERENCES

Barrer "J. Chem. Soc." 1948, pp. 2158–2163.

EDWARD J. MEROS, *Primary Examiner.*